United States Patent
Lee et al.

(10) Patent No.: US 10,854,904 B2
(45) Date of Patent: Dec. 1, 2020

(54) POLYMER ELECTROLYTE MEMBRANE, A METHOD FOR FABRICATING THE SAME, AND A MEMBRANE-ELECTRODE ASSEMBLY INCLUDING THE SAME

(71) Applicant: KOLON INDUSTRIES, INC., Gwacheon-si (KR)

(72) Inventors: Moo Seok Lee, Seoul (KR); Yong Cheol Shin, Seoul (KR); Na Young Kim, Yongin-si (KR); Dong Hoon Lee, Goyang-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 453 days.

(21) Appl. No.: 14/387,899

(22) PCT Filed: Mar. 28, 2013

(86) PCT No.: PCT/KR2013/002569
§ 371 (c)(1),
(2) Date: Sep. 25, 2014

(87) PCT Pub. No.: WO2013/147520
PCT Pub. Date: Oct. 3, 2013

(65) Prior Publication Data
US 2015/0064602 A1 Mar. 5, 2015

(30) Foreign Application Priority Data

Mar. 29, 2012 (KR) .................. 10-2012-0032715

(51) Int. Cl.
*H01M 8/1067* (2016.01)
*H01M 8/1053* (2016.01)
(Continued)

(52) U.S. Cl.
CPC ....... *H01M 8/1067* (2013.01); *H01M 8/1048* (2013.01); *H01M 8/1053* (2013.01);
(Continued)

(58) Field of Classification Search
CPC ............. H01M 8/1041; H01M 8/1048; H01M 8/1053; H01M 2300/82; H01M 2300/97
See application file for complete search history.

(56) References Cited

U.S. PATENT DOCUMENTS

2007/0122662 A1   5/2007  Budinski et al.
2009/0068530 A1*  3/2009  Hiraoka ............ H01M 8/1051
                                                      429/483
(Continued)

FOREIGN PATENT DOCUMENTS

JP   2009187803 A    8/2009
JP   2013511806 A    4/2013
(Continued)

OTHER PUBLICATIONS

Wang et al., "Novel multilayer Nafion/SPI/Nafion composite membrane for PEMFCs," J. Power Sources 164 (2007) (80-85), available Nov. 27, 2006.*
(Continued)

*Primary Examiner* — Amanda J Barrow
(74) *Attorney, Agent, or Firm* — Sughrue Mion, PLLC (57) ABSTRACT

Disclosed are a polymer electrolyte membrane, a method for manufacturing the same and a membrane-electrode assembly comprising the same, the polymer electrolyte membrane includes a hydrocarbon-containing ion conductive layer; and a fluorine-containing ion conductor discontinuously dispersed on the hydrocarbon-containing ion conductive layer.

15 Claims, 1 Drawing Sheet

(51) Int. Cl.
*H01M 8/1081* (2016.01)
*H01M 8/10* (2016.01)
*H01M 8/1069* (2016.01)
*H01M 8/1048* (2016.01)
*H01M 8/1018* (2016.01)

(52) U.S. Cl.
CPC ....... *H01M 8/1069* (2013.01); *H01M 8/1081* (2013.01); *H01M 2008/1095* (2013.01); *H01M 2300/0082* (2013.01); *Y02P 70/56* (2015.11)

(56) References Cited

U.S. PATENT DOCUMENTS

2012/0015254 A1   1/2012   Lee et al.
2013/0101918 A1*  4/2013   Yandrasits .......... H01M 8/1023
                                                        429/482

FOREIGN PATENT DOCUMENTS

| KR | 10-2004-0092024 A | 11/2004 |
| KR | 10-2009-0039180 A | 4/2009 |
| KR | 10-2009-0132214 A | 12/2009 |
| KR | 10-2011-0001022 A | 1/2011 |
| WO | 2011/025259 A1 | 3/2011 |

OTHER PUBLICATIONS

Laforgue et al., "Fabrication and Characterization of Ionic Conducting Nanofibers," Macromol. Mater. Eng. 2007, 292, 1229-1236 (month unkonwn).*
Google Define feature for definitions of "discontinuous" and "disperse," accessed Oct. 6, 2017, www.google.com.*
Suizu et al., "Electro-Osmotic Flow Across Nafion-112 Membrane," On-line No. 1068, Asian Pacific Confederation of Chemical Engineers Congress Program and Abstracts (2004), accessed at https://www.jstage.jst.go.jp/article/apcche/2004/0/2004_0_524/_pdf (Year: 2004).*
Wang et al., "Novel multilayer Nafion/SPI/Nafion composite membrane for PEMFCs," ScienceDirect: Journal of Power Sources 164 (2007) p. 80-85.
International Searching Authority, International Search Report for PCT/KR2013/002569 dated Jun. 25, 2013.
Translation of KR 10-2009-0039180 (cited Sep. 25, 2014).
Translation of KR 10-2009-0132214 (cited Sep. 25, 2014).

* cited by examiner

POLYMER ELECTROLYTE MEMBRANE, A METHOD FOR FABRICATING THE SAME, AND A MEMBRANE-ELECTRODE ASSEMBLY INCLUDING THE SAME

TECHNICAL FIELD

The present invention relates to a polymer electrolyte membrane, a method for manufacturing the same and a membrane-electrode assembly comprising the same. More particularly, the present invention relates to a polymer electrolyte membrane which has an excellent adhesion to an electrode, accordingly can improve the performance of a fuel cell by decreasing the interfacial resistance, and can easily bond to the electrode by transferring with improved efficiency.

BACKGROUND ART

Fuel cells are cells that directly convert the chemical energy generated by oxidation of a fuel to electrical energy, and attention is being paid to the fuel cells as a next-generation energy source due to their environment-friendly features of high energy conversion efficiency and reduced contaminant discharge.

A fuel cell generally has a structure in which an anode and a cathode are formed, with an electrolyte membrane interposed therebetween, and such a structure is called a membrane-electrode assembly (MEA).

Fuel cells can be classified into alkaline electrolyte fuel cells, polymer electrolyte membrane fuel cells (PEMFC), and the like, and among them, polymer electrolyte membrane fuel cells are attracting more attention as power source apparatuses for portable, automobile and domestic applications, due to their advantages such as a low operation temperature such as below 100° C., fast starting and fast response characteristics, and excellent durability.

A representative example of such a polymer electrolyte membrane fuel cell is a proton exchange membrane fuel cell (PEMFC) that uses hydrogen gas as the fuel.

To briefly describe the reaction occurring in a polymer electrolyte membrane fuel cell, first, when a fuel such as hydrogen gas is supplied to an anode, an oxidation reaction of hydrogen occurs at the anode, and thereby hydrogen ions ($H^+$) and electrons ($e^-$) are produced. The hydrogen ions ($H^+$) thus produced are transferred to a cathode through a polymer electrolyte membrane, and electrons ($e^-$) thus produced are transferred to the cathode through an external circuit. Oxygen is supplied to the cathode, and oxygen binds with hydrogen ions ($H^+$) and electrons ($e^-$), and water is produced by a reduction reaction of oxygen.

Since the polymer electrolyte membrane is a channel through which the hydrogen ions ($H^+$) produced at the anode are transferred to the cathode, the polymer electrolyte membrane should essentially have excellent conductivity for hydrogen ions ($H^+$). Furthermore, the polymer electrolyte membrane should have excellent separation capability of separating hydrogen gas that is supplied to the anode and oxygen that is supplied to the cathode, and should also have excellent mechanical strength, dimensional stability, chemical resistance and the like, and characteristics such as a small ohmic loss at a high current density are required.

One of those polymer electrolyte membranes that are currently in use may be an electrolyte membrane made of a perfluorosulfonic acid resin as a fluororesin (hereinafter, referred to as "fluorine ion conductor"). However, a fluorine ion conductor has weak mechanical strength, and thus has a problem that when used for a long time, pinholes are generated, and thereby the energy conversion efficiency is decreased. In order to increase the mechanical strength, there has been an attempt of using a fluorine ion conductor having an increased membrane thickness; however, in this case, there is a problem that the ohmic loss is increased, and the use of expensive materials increases, so that the economic efficiency is low.

In order to address such problems, there has been suggested a polymer electrolyte membrane having enhanced mechanical strength by impregnating a porous polytetrafluoroethylene resin (trade name: TEFLON) (hereinafter, referred to as "Teflon resin"), which is a fluororesin, with a liquid-state fluorine ion conductor. In this case, the hydrogen ion conductivity may be somehow inferior as compared with polymer electrolyte membranes composed of a fluorine ion conductor alone; however, the impregnated polymer electrolyte membrane is advantageous in that the polymer electrolyte membrane has relatively superior mechanical strength, and can therefore have a reduced thickness, so that the ohmic loss is decreased.

However, since a Teflon resin has very poor adhesiveness, there are limitations on the selection of the ion conductor, and in the case of products produced by applying fluorine ion conductors, the products have a disadvantage that the fuel crossover phenomenon occurs conspicuously as compared with hydrocarbon-based ion conductors. Furthermore, because not only fluorine ion conductors but also porous Teflon resins are highly expensive, there still is a demand for the development of a new inexpensive material for the mass production of fuel cells.

Meanwhile, the electrode including a fluorine-containing binder, which is used for manufacturing the membrane-electrode assembly, shows the best performance. However, the electrode has a poor adhesion with the hydrocarbon-containing ion conductor, the hydrocarbon-containing ion conductor being researched recently. Further, a decal process is mainly applied for manufacturing the membrane-electrode assembly due to their high productivity and convenience of the process. However, the hydrocarbon-containing ion conductor is not efficient for the decal process due to their surface property.

PRIOR ART DOCUMENTS

Patent Documents (Patent document 0001) Korean Patent Laid-Open Publication No. 10-2006-0083374, 2006 Jul. 20
(Patent document 0002) Korean Patent Laid-Open Publication No. 10-2006-0083372, 2006 Jul. 20
(Patent document 0003) Korean Patent Laid-Open Publication No. 10-2011-0120185, 2011 Nov. 3

The above information disclosed in this Background section is only for enhancement of understanding of the background of the invention and therefore it may contain information that does not form the prior art that is already known in this country to a person of ordinary skill in the art.

DISCLOSURE

Technical Problem

An object of the present invention is to provide a polymer electrolyte membrane, which has an excellent adhesion to an electrode, accordingly can improve the performance of a fuel cell by decreasing the interfacial resistance, and can easily bond to the electrode by transferring with improved efficiency.

Another object of the present invention is to provide a method for producing the polymer electrolyte membrane, which can achieve the excellent adhesion to the electrode with the minimum quantity of the fluorine-containing ion conductor.

Yet another object of the present invention is to provide a membrane-electrode assembly manufactured by the method, which has an excellent adhesion to the electrode.

Technical Solution

In order to achieve the objects described above, the polymer electrolyte membrane in various aspects of the present invention may include: a hydrocarbon-containing ion conductive layer; and a fluorine-containing ion conductor discontinuously dispersed on the hydrocarbon-containing ion conductive layer.

The discontinuous dispersion of the fluorine-containing ion conductor may consist of a fiber-shaped fluorine-containing ion conductor or a spot-shaped fluorine-containing ion conductor discontinuously dispersed on the hydrocarbon-containing ion conductive layer.

The fiber-shaped fluorine-containing ion conductor may have an average diameter ranging from 0.005 to 5 µm.

The fiber-shaped fluorine-containing ion conductor may have a ratio of an average length to an average diameter being 100% or greater.

The spot-shaped fluorine-containing ion conductor may have an average diameter ranging from 0.005 to 10 µm.

The fluorine-containing ion conductor may be included in an amount of 0.1 to 10 wt % based on the total weight of the polymer electrolyte membrane.

The fluorine-containing ion conductor may be bonded to the hydrocarbon-containing ion conductive layer after dissolving the hydrocarbon-containing ion conductive layer.

The fluorine-containing ion conductor may be a perfluorosulfonic acid (PFSA).

The hydrocarbon-containing ion conductive layer may comprise any one selected form the group consisting of a sulfonated polyimide (S-PI), a sulfonated polyarylethersulfone (S-PAES), a sulfonated polyether ether ketone (S-PEEK), a sulfonated polybenzimidazole (S-PBI), a sulfonated polysulfone (S-PSU), a sulfonated polystyrene (S-PS), a sulfonated polyphosphazene, and combinations thereof.

In one or more exemplary embodiments, the polymer electrolyte membrane may comprise: a porous substrate; a hydrocarbon-containing ion conductor filled in the pores of the porous substrate; a hydrocarbon-containing ion conductive layer disposed on the upper or lower surfaces of the porous substrate; and a fluorine-containing ion conductor discontinuously dispersed on the hydrocarbon-containing ion conductive layer.

The porous substrate may be any one selected from the group of consisting a nylon, a polyimide, a polybenzoxazole, a polyethylene terephthalate, a polyethylene, a polypropylene, a polytetrafluoroethylene, a polyarylene ether sulfone, a polyether ether ketone, copolymers thereof, and combinations thereof.

According to another aspect of the present invention, there is provided a method for producing a polymer electrolyte membrane comprising a step of forming a hydrocarbon-containing ion conductive layer; and a step of discontinuously dispersing a fluorine-containing ion conductor on the hydrocarbon-containing ion conductive layer.

In one or more exemplary embodiments, the method for producing a polymer electrolyte membrane may comprise a step of preparing a porous substrate; a step of filling a hydrocarbon-containing ion conductor in the pores of the porous substrate and forming a hydrocarbon-containing ion conductive layer on the upper or lower surfaces of the porous substrate; and a step of discontinuously dispersing a fluorine-containing ion conductor on the hydrocarbon-containing ion conductive layer.

The fluorine-containing ion conductor may be discontinuously dispersed on the hydrocarbon-containing ion conductive layer by electrospinning or spraying.

A solution for forming the fluorine-containing ion conductor may comprise an organic solvent capable of dissolving a surface of the hydrocarbon-containing ion conductive layer.

The solution for forming the fluorine-containing ion conductor may include an alcohol dispersion of the fluorine-containing ion conductor and the organic solution capable of dissolving the surface of the hydrocarbon-containing ion conductive layer.

The organic solvent capable of dissolving the hydrocarbon-containing ion conductive layer may be any one selected from the group consisting of N-methyl-2-pyrrolidine (NMP), dimethylformamide (DMF), dimethylacetamide (DMA), dimethylsulfoxide (DMSO), and combination thereof.

In one or more exemplary embodiments, the step of discontinuously dispersing the fluorine-containing ion conductor may include a step of preparing a solution for forming the fluorine-containing ion conductor comprising an alcohol dispersion of the fluorine-containing ion conductor and the organic solvent capable of dissolving the hydrocarbon-containing ion conductive layer; and a step of coating the solution on the hydrocarbon-containing ion conductive layer.

According to yet another aspect of the present invention, there is provided a membrane-electrode assembly comprising: an anode and a cathode facing each other; and a polymer electrolyte membrane disposed between the anode and cathode, wherein the polymer electrolyte membrane comprises a hydrocarbon-containing ion conductive layer, and a fluorine-containing ion conductor discontinuously dispersed on the hydrocarbon-containing ion conductive layer.

The anode or the cathode may include a fluorine-containing binder.

Advantageous Effects

The polymer electrolyte membrane according to the present invention has an excellent adhesion to an electrode, accordingly can improve the performance of a fuel cell by decreasing the interfacial resistance, and can easily bond to the electrode by transferring with improved efficiency.

Furthermore, the method for producing the polymer electrode membrane can achieve the excellent adhesion to the electrode with the minimum quantity of the fluorine-containing ion conductor. Also, the polymer electrolyte membrane manufactured by the method has an excellent adhesion to the electrode.

BEST MODE

Hereinafter, the present invention will be described in more detail.

The polymer electrolyte membrane according to an embodiment of the present invention includes a hydrocarbon-containing ion conductive layer, and a fluorine-containing ion conductor discontinuously dispersed on the hydrocarbon-containing ion conductive layer.

In one or more exemplary embodiments, the polymer electrolyte membrane may comprise: a porous substrate; a hydrocarbon-containing ion conductor filled in the pores of the porous substrate; a hydrocarbon-containing ion conductive layer disposed on the upper or lower surfaces of the porous substrate; and a fluorine-containing ion conductor discontinuously dispersed on the hydrocarbon-containing ion conductive layer.

The polymer electrolyte membrane may be a single-layered membrane of the hydrocarbon-containing ion conductive layer formed in the shape of a sheet or a film, and the fluorine-containing ion conductor discontinuously dispersed on the single-layered hydrocarbon-containing ion conductive layer. Also, the polymer electrolyte membrane may be a reinforced membrane which comprises the porous substrate filled its pores with the hydrocarbon-containing ion conductor or coated its surfaces with the hydrocarbon-containing ion conductor, and then the fluorine-containing ion conductor discontinuously dispersed on the hydrocarbon-containing ion conductor.

Hereinafter, the polymer electrolyte membrane will be described in the case of the reinforced membrane, but the polymer electrolyte membrane is not intended to be limited to this.

The porous nanoweb support is composed of aggregates of nanofibers that are three-dimensionally connected in an irregular and non-continuous manner, and therefore, the porous nanoweb support contains a large number of pores that are uniformly distributed. The porous nanoweb support containing a large number of uniformly distributed pores has excellent gas or ion conductivity.

The pore diameter, which is the diameter of the pores formed in the porous nanoweb support, may be in the range of 0.05 μm to 30 μm. If pores are formed to have a pore diameter of less than 0.05 μm, the ion conductivity of the polymer electrolyte membrane may be decreased, and if the pore diameter exceeds 30 μm, the mechanical strength of the polymer electrolyte membrane may be decreased.

Furthermore, the porosity that represents the extent of formation of pores in the porous nanoweb support may be in the range of 50% to 98%. If the porosity of the porous nanoweb support is lower than 50%, the ion conductivity of the polymer electrolyte membrane may be decreased, and if the porosity is higher than 98%, the mechanical strength and morphological stability of the polymer electrolyte membrane may be decreased.

Figure 1:
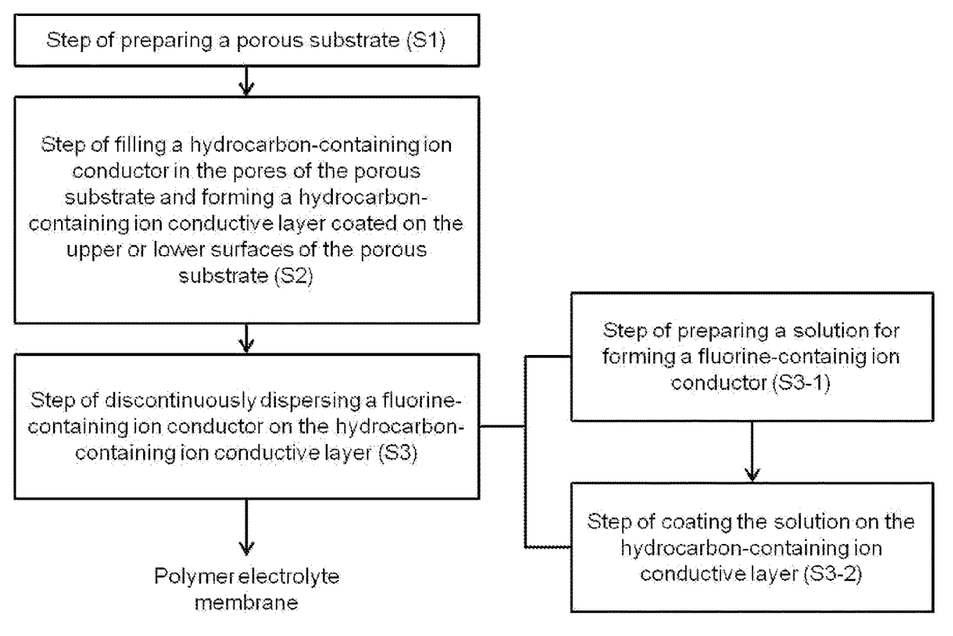
FIG. 1 is a process flow diagram showing the method for producing a polymer electrolyte membrane according to an another embodiment of the present invention.

The porosity (%) can be calculated based on the ratio of the volume of air relative to the total volume of the porous nanoweb support, as shown by the following mathematical formula (1):

Porosity(%)=(volume of air/total volume)×100    [Math Figure 1]

At this time, the total volume of the porous nanoweb support is calculated by producing a rectangular-shaped sample of the porous nanoweb support, and measuring the width, length and thickness of the sample. The volume of air in the porous nanoweb support may be obtained by measuring the mass of the porous nanoweb support sample, and then subtracting the polymer volume that has been calculated backward from the density, from the total volume of the porous nanoweb support sample.

The porous nanoweb support is composed of aggregates of nanofibers that are three-dimensionally connected in an irregular and non-continuous manner. The average diameter of the nanofiber may be in the range of 0.005 μm to 5 μm. If the average diameter of the nanofiber is less than 0.005 μm, the mechanical strength of the porous nanoweb support may be decreased, and if the average diameter of the nanofiber is greater than 5 μm, the porosity of the porous nanoweb support may not be easily controlled.

The nanofiber may be any one selected from the group consisting of fibers made of a nylon, a polyimide, a polybenzoxazole, a polyethylene terephthalate, a polyethylene, a polypropylene, a polytetrafluoroethylene, a polyarylene ether sulfone, a polyether ether ketone, copolymers thereof, and combinations thereof, but the nanofiber is not intended to be limited to these.

The porous nanoweb support can be formed to have a thickness of 5 μm to 20 μm. If the thickness of the porous nanoweb support is less than 5 μm, the mechanical strength and morphological stability of the polymer electrolyte membrane may be decreased, and if the thickness of the porous nanoweb support is greater than 20 μm, the ohmic loss of the polymer electrolyte membrane may increase.

The polymer electrolyte membrane includes a hydrocarbon-containing ion conductor filled in the pore of the porous substrate.

The hydrocarbon-containing ion conductor is a substance that implements the function of ion conduction, which is the principal function of a polymer electrolyte membrane, and as the ion conductor, a hydrocarbon-based polymer that has excellent ion conduction function and is advantageous in terms of price can be preferably used, but the ion conductor is not limited thereto. Particularly, for the facilitation of the process of filling the ion conductor inside the pores of the porous nanoweb support, a hydrocarbon substance which is soluble in organic solvents can be more preferably used.

The hydrocarbon-containing ion conductor may be any one selected from the group consisting of a sulfonated polyimide, a sulfonated polyarylethersulfone, a sulfonated polyether ether ketone, a sulfonated polybenzimidazole, a sulfonated polysulfone, a sulfonated polystyrene, a sulfonated polyphosphazene, and combinations thereof, but the ion conductor is not intended to be limited to these.

On the other hand, in the case that the ion conductor and the porous substrate are made from the hydrocarbon-based material, the hydrocarbon-based material of the hydrocarbon-containing ion conductor and the hydrocarbon-based material of the porous substrate may be the same kind of hydrocarbon-based materials. Specifically, if the hydrocarbon-containing ion conductor is made from S-PI (sulfonated polyimide) and the porous substrate is made from polyimide, the adhesion between the hydrocarbon-containing ion conductor and the porous substrate may be improved.

The polymer electrolyte membrane includes the fluorine-containing ion conductor discontinuously dispersed on the surface thereof. When the membrane-electrode assembly is manufactured by coupling the polymer electrolyte membrane and the electrode, the fluorine-containing ion conductor can improve the adhesion between the polymer electrolyte membrane and the electrode by being deposed on the surface of the polymer electrolyte membrane.

That is, the electrode including a fluorine-containing binder, which is used for manufacturing the membrane-electrode assembly, shows the best performance. However, the electrode has a poor adhesion with the hydrocarbon-based ion conductor, the hydrocarbon-based ion conductor being researched recently. The polymer electrolyte membrane according to an exemplary embodiment of the present invention has an excellent adhesion with the electrode, since the polymer electrolyte membrane includes the fluorine-containing ion conductor on the surface thereof.

Further, a decal process is mainly applied for manufacturing the membrane-electrode assembly due to their high productivity and convenience of the process. However, the hydrocarbon-based polymer electrolyte membrane is less suitable for the decal process than the fluorine-containing polymer electrolyte membrane due to their surface property. The polymer electrolyte membrane according to an exemplary embodiment of the present invention is advantageous in the decal process, since the polymer electrolyte membrane includes the fluorine-containing ion conductor on the surface thereof.

The fluorine-containing ion conductor may have a shape of fiber or spot, and the fiber-shaped or the spot-shaped fluorine-containing ion conductor is discontinuously dispersed on the hydrocarbon-containing ion conductive layer. The fluorine-containing ion conductor is not coated on the whole surface of the hydrocarbon-containing ion conductive layer, but coated on the partial surface of the hydrocarbon-containing ion conductive layer, since the fluorine-containing ion conductor is discontinuously dispersed on the hydrocarbon-containing ion conductive layer. Thus, the hydrocarbon-containing ion conductive layer is revealed between the fluorine-containing ion conductors. The fluorine-containing ion conductor can be formed in the shape of fiber or spot so as to be discontinuously dispersed on the hydrocarbon-containing ion conductive layer.

The fiber-shaped or the spot-shaped fluorine-containing ion conductor can be formed by electrospinning and spraying. In this case, the fluorine-containing ion conductor can maximize the adhesion to the electrode with the minimum quantity of it and the thickness of the polymer electrolyte membrane is thinner in spite of comprising the fluorine-containing ion conductor.

The fiber-shaped fluorine-containing ion conductor may have an average diameter in a range of 0.005 to 5 μm, preferably 0.01 to 3 μm. Also, the fiber-shaped fluorine-containing ion conductor may have a ratio of an average length to an average diameter being 100% or greater. When the average diameter of the fiber-shaped fluorine-containing ion conductor is less than 0.005 μm, the strength of the fluorine-containing ion conductive layer is decreased so that the adhesion between the polymer electrolyte membrane and the fluorine-containing ion conductive layer are decreased. When the average diameter of the fiber-shaped fluorine-containing ion conductor is greater than 5 μm or the ratio of an average length to an average diameter is less than 100%, the thickness of the fluorine-containing ion conductor is so thick that the membrane resistance grow serious.

The spot-shaped fluorine-containing ion conductor may have an average diameter in a range of 0.005 to 10 μm, preferably 0.01 to 5 μm. When the average diameter of the spot-shaped fluorine-containing ion conductor is less than 0.005 μm, the strength of the fluorine-containing ion conductive layer is decreased so that the adhesion between the polymer electrolyte membrane and the fluorine-containing ion conductive layer are decreased. When the average diameter of the spot-shaped fluorine-containing ion conductor is greater than 10 μm, the thickness of the fluorine-containing ion conductive layer is so thick that the membrane resistance grow serious.

The fluorine-containing ion conductor is included in an amount of 0.1 to 10 wt %, preferably 1 to 10 wt % based on the entire weight of the polymer electrolyte membrane. In this case, the fluorine-containing ion conductor can improve the adhesion to the electrode with the minimum quantity of it and the thickness of the polymer electrolyte membrane is thinner in spite of comprising the fluorine-containing ion conductor. When the amount of the fluorine-containing ion conductor is less than 1 wt %, the effect of improved adhesion is decreased. When the amount of the fluorine-containing ion conductor is more than 10 wt %, the production cost may rise due to an excessive use of the highly expansive fluorine-containing ion conductor.

The fluorine-containing ion conductor may be bonded to the hydrocarbon-containing ion conductive layer after dissolving the hydrocarbon-containing ion conductive layer. That is, a partial surface of the hydrocarbon-containing ion conductive layer is dissolved, and thus the dissolved hydrocarbon-containing ion conductive layer is adhered to the fluorine-containing ion conductor. After that, the dissolved hydrocarbon-containing ion conductive layer becomes hard back so as to be coupled with the fluorine-containing ion conductor, and thus the adhesion durability between the hydrocarbon-containing ion conductive layer and the fluorine-containing ion conductor is improved.

The fluorine-containing ion conductor which can be suitably used in the present invention is not limited particularly; it can be preferably used having an acid resistance at a pH of 1 to 3, and having proton conductivity.

The fluorine-containing ion conductor may be a perfluorosulfonic acid (PFSA), such as the Nafion manufactured by DuPont, the Flemion manufactured by Asahi Glass or the Aciplex manufactured by Asahi Chemicals and the likes.

The fluorine-containing ion conductor can improve the adhesion between the electrode including the fluorine-containing ion conductive binder and the hydrocarbon-based polymer electrolyte membrane.

The method for producing a polymer electrolyte membrane according to another embodiment of the present invention includes: a step of forming a hydrocarbon-containing ion conductive layer; and a step of discontinuously dispersing a fluorine-containing ion conductor on the hydrocarbon-containing ion conductive layer.

In one or more exemplary embodiments, the method for producing a polymer electrolyte membrane may comprise: a step of preparing a porous substrate; a step of filling a hydrocarbon-containing ion conductor in the pores of the porous substrate and forming a hydrocarbon-containing ion conductive layer on the upper or lower surfaces of the porous substrate; and a step of discontinuously dispersing a fluorine-containing ion conductor on the hydrocarbon-containing ion conductive layer.

Hereinafter, the method for producing the polymer electrolyte membrane will be described in the case of the reinforced membrane comprising the porous substrate, but the method for producing the polymer electrolyte membrane is not intended to be limited to this.

FIG. 1 is a process flow diagram showing the method for producing a polymer electrolyte membrane according to an embodiment of the present invention. Hereinafter, the method for producing a polymer electrolyte membrane will be described with reference to FIG. 1.

The step (S1) of preparing a porous substrate includes processes of dissolving a precursor in a spinning solvent to prepare a spinning solution, spinning the spinning solution thus prepared to produce a porous substrate composed of nanofibers having an average diameter of 0.005 µm to 5 µm, and then treating the porous substrate thus produced by a post-treatment.

It is preferable to produce the porous substrate through an electrospinning process in order to obtain a thin film having a high porosity and fine pores, but the process is not limited thereto.

The porous substrate can be produced by spinning any one selected from the group consisting of a nylon, a polyimide, a polybenzoxazole, a polyethylene terephthalate, a polyethylene, a polypropylene, a polytetrafluoroethylene, a polyarylene ether sulfone, a polyether ether ketone, copolymers thereof, and combinations thereof.

The production of the porous substrate using a polyimide may be specifically described as follows.

A polyimide porous substrate can be produced by electrospinning a polyamic acid precursor to form a nanoweb precursor, and then imidizing the nanoweb precursor using a hot press.

More specifically, a polyimide porous substrate can be produced by dissolving a polyamic acid in tetrahydrofuran (THF) solvent to prepare a precursor solution; discharging the precursor solution through a spinning nozzle while a high voltage of 1 to 1,000 kV is applied at a temperature of 20° C. to 100° C., to form a polyamic acid substrate on a collector; and then heat treating the polyamic acid substrate with a hot press set to a temperature of 80° C. to 400° C.

The porous substrate can improve the heat resistance, chemical resistance and mechanical properties of the polymer electrolyte membrane, as compared with polymer electrolytes comprising only the hydrocarbon-containing ion conductors.

The hydrocarbon-containing ion conductor is filled in the pores of the porous substrate and the hydrocarbon-containing ion conductive layer is coated on the upper or lower surfaces of the porous substrate (S2). Since the description on the hydrocarbon-containing ion conductor is the same as the description given for the polymer electrolyte membrane according to an embodiment of the present invention, and therefore, further specific descriptions thereon will not be repeated here.

However, the weight average molecular weight of the hydrocarbon-containing ion conductor may be 10,000 g/mol to 500,000 g/mol, and is preferably 50,000 g/mol to 300,000 g/mol. When the weight average molecular weight of the hydrocarbon-containing ion conductor is a low molecular weight in the range described above, the durability of the polymer electrolyte membrane may be decreased, and when the weight average molecular weight of the hydrocarbon-containing ion conductor is a high molecular weight in the range described above, the impregnation of the hydrocarbon-containing ion conductor into the pores of the porous substrate may not be facilitated.

For the process of filling the hydrocarbon-containing ion conductor in the pores of the porous substrate, an dipping process or an impregnation process can be used, but the process is not limited thereto, and various methods that are known in the pertinent art, such as a lamination method, a spraying method, a screen printing method, and a doctor blade method can be utilized.

Herein, the hydrocarbon-containing ion conductive layer is formed on the surface of the porous substrate during the step of filling the hydrocarbon-containing ion conductor into the pores of the porous substrate.

Specifically, in the impregnation process, the ion conductor solution is formed by dissolving the hydrocarbon-containing ion conductor in a solvent, and then the porous substrate may be impregnated in the ion conductor solution thus produced. The impregnation may be carried out at a room temperature for 5 to 30 minutes. Then, a dry process may be followed in a hot air oven at 80° C. for 3 hours or more, and the impregnation and dry process may be carried out 2 to 5 times.

Meanwhile, in the case that the polymer electrolyte membrane is not the reinforced membrane but the single-layered hydrocarbon-containing ion conductive layer, the hydrocarbon-containing ion conductive layer may be formed by coating and drying the ion conductive solution on the substrate.

Subsequently, the fluorine-containing ion conductor is discontinuously dispersed on the surface of the porous substrate thus produced (S3).

For the process of discontinuously dispersing the fluorine-containing ion conductor on the surface of the hydrocarbon-containing ion conductive layer, an electrospinning method, a laminating method, a spraying method, a screen printing method, a doctor blade method, an dipping method, and various methods that are known in the pertinent art can be used, preferably the electrospinning or the spraying method can be used. The spraying method comprises an electrospraying method.

In the case that the fluorine-containing ion conductor is formed by the electrospinning method or the spraying, the fluorine-containing ion conductor may be discontinuously dispersed on the hydrocarbon-containing ion conductive layer in the shape of fiber or spot. The fiber-shaped or the spot-shaped fluorine-containing ion conductor can improve the adhesion to the electrode with the minimum quantity of it and the thickness of the polymer electrolyte membrane is thinner in spite of comprising the fluorine-containing ion conductor.

Meanwhile, the step of discontinuously dispersing the fluorine-containing ion conductor on the hydrocarbon-containing ion conductive layer (S3) may include the first step of preparing a solution for forming the fluorine-containing ion conductor comprising an alcohol dispersion of the fluorine-containing ion conductor and the organic solvent capable of dissolving the hydrocarbon-containing ion conductive layer (S3-1); and the second step of coating the solution on the hydrocarbon-containing ion conductive layer (S3-2).

In the case that the fluorine-containing ion conductor is formed by using the solution including the fluorine-containing ion conductor and the organic solvent capable of dissolving the hydrocarbon-containing ion conductor, a partial surface of the hydrocarbon-containing ion conductive layer is dissolved, and thus the dissolved hydrocarbon-containing ion conductive layer is adhered to the fluorine-containing ion conductor. After that, the dissolved hydrocarbon-containing ion conductive layer becomes hard back so as to be coupled with the fluorine-containing ion conductor, and thus the adhesion durability between the hydrocarbon-containing ion conductive layer and the fluorine-containing ion conductor is improved.

The melting adhesion of the hydrocarbon-containing ion conductive layer with the fluorine-containing ion conductor may be possible, only if the fluorine-containing ion conductor is discontinuously dispersed. In the case that the fluorine-containing ion conductor is continuously coated on the hydrocarbon-containing ion conductive layer by dipping, the hydrocarbon-containing ion conductive layer may be damaged and crumpled by being extremely exposed to the organic solvent capable of dissolving the surface of the hydrocarbon-containing ion conductive layer. On the other hand, the discontinuously dispersed fluorine-containing ion conductor may be formed by the electrospinning method or the spraying method so that the hydrocarbon-containing ion conductive layer is not damaged or crumpled.

At this time, the organic solvent capable of dissolving the ion conductor may be any one selected from the group consisting of N-methyl-2-pyrrolidine (NMP), dimethylformamide (DMF), dimethylacetamide (DMA), dimethylsulfoxide (DMSO), and combination thereof.

The membrane-electrolyte assembly according to other embodiment of the present invention includes an anode and a cathode facing each other, and a polymer electrolyte membrane disposed between the anode and cathode. Since the description on the polymer electrolyte membrane is the same as the description given for the polymer electrolyte membrane according to an embodiment of the present invention, and therefore, further specific descriptions thereon will not be repeated here.

The membrane-electrolyte assembly is a part of generating an electricity, and one or several of them are filed so as to form a stack. The anode and the cathode respectively includes a catalyst and a binder.

The fluorine-containing ion conductor may be preferably used as the electrode binder, and the polymer electrolyte membrane according to the present invention may include the hydrocarbon-based polymer electrolyte membrane. Thus, the adhesion between the polymer electrolyte membrane and the electrode become an object of the present invention. However, the polymer electrolyte membrane has an improved adhesion to the electrode due to including the fluorine-containing ion conductor on the surface thereof.

MODE FOR INVENTION

Hereinafter, the present invention will be described more specifically by way of Examples and Comparative Examples. However, the following Examples are only for illustrative purposes, and are not intended to limit the scope of rights of the present invention by any means.

Preparation Example

Preparation of Polymer Electrolyte Membrane and Membrane-Electrode Assembly

Example 1

A S-PEEK (sulfonated polyether ether ketone) was dissolved in N-methyl-2-pyrrolidone (NMP), and thus a 10 wt % ion conductor solution was prepared. The ion conductor solution was coated on the glass substrate. The coated layer was dried for 24 hours at 50° C. Then, the coated layer was separated from the glass substrate, thereby a hydrocarbon-containing ion conductive layer having a thickness of 20 μm was formed.

A solution for forming the fluorine-containing ion conductor was prepared by adding DMF of 5% into the IPA dispersion containing 10% of a Nafion. The fluorine-containing ion conductor was formed by spraying the solution for forming the fluorine-containing ion conductor on the surface of the hydrocarbon-containing ion conducting layer, and then drying at 80° C. for 10 hours.

On the other hand, an electrode was prepared by coating an electrode slurry containing a Nafion binder on a PI film, and was cut out into the size of 5×5 cm². The electrode thus produced was transferred to the polymer electrolyte membrane while the pressure of 1,000 kg/cm² was applied at 100° C. so as to the membrane-electrode assembly was produced.

Example 2

A membrane-electrode assembly was produced in the same manner as in Example 1, except that a fiber-shaped fluorine-containing ion conductor was discontinuously dispersed by electrospinning the solution for forming the fluorine-containing ion conductor on the surface of the hydrocarbon-containing ion conductive layer.

Example 3

A polyamic acid/THF spinning solution at a concentration of 12 wt % was electrospun while a voltage of 30 kV was applied, and thereby a polyamic acid porous substrate precursor was formed. Subsequently, the porous substrate precursor was heat treated in an oven at 350° C. for 5 hours, and thus a polyimide porous substrate having an average thickness of 15 μm was produced. At this time, the electrospinning process was carried out using a spray jet nozzle at 25° C. while a voltage of 30 kV was applied.

A S-PEEK (sulfonated polyether ether ketone) as an ion conductor was dissolved in N-methyl-2-pyrrolidone (NMP), and thus a 10 wt % ion conductor solution was prepared.

The porous substrate was immersed in the ion conductor solution. Specifically, the dipping process was carried out three times for 20 minutes at normal temperature, and at this time, a reduced pressure atmosphere was applied for about one hour to eliminate fine gas bubbles. After that, the NMP was eliminated by drying in a hot air oven at 80° C. for 3 hours. The hydrocarbon-containing ion conducting layer having an average thickness of 45 μm was prepared by repeating the dipping and drying 3 times.

A solution for forming the fluorine-containing ion conductor was prepared by adding DMF of 5% into the IPA dispersion containing 10% of a Nafion. The fluorine-containing ion conductor was formed by spraying the solution for forming the fluorine-containing ion conductor on the surface of the hydrocarbon-containing ion conducting layer, and then drying at 80° C. for 10 hours.

On the other hand, an electrode was prepared by coating an electrode slurry containing a Nafion binder on a PI film, and was cut out into the size of 5×5 cm². The electrode thus produced was transferred to the polymer electrolyte membrane while the pressure of 1,000 kg/cm² was applied at 100° C. so as to the membrane-electrode assembly was produced.

Example 4

A membrane-electrode assembly was produced in the same manner as in Example 3, except that a fiber-shaped fluorine-containing ion conductor was discontinuously dispersed by electrospinning the solution for forming the fluorine-containing ion conductor on the surface of the hydrocarbon-containing ion conductive layer.

Comparative Example 1

A S-PEEK (sulfonated polyether ether ketone) was dissolved in N-methyl-2-pyrrolidone (NMP), and thus a 10 wt % ion conductor solution was prepared. The ion conductor solution was coated on the glass substrate. The coated layer was dried for 24 hours at 50° C. Then, the coated layer was separated from the glass substrate, thereby a polymer electrolyte membrane having a thickness of 20 μm was formed.

On the other hand, an electrode was prepared by coating an electrode slurry containing a Nafion binder on a PI film, and was cut out into the size of 5×5 cm². The electrode thus produced was transferred to the polymer electrolyte membrane while the pressure of 1,000 kg/cm² was applied at 100° C. so as to the membrane-electrode assembly was produced.

Comparative Example 2

A S-PEEK (sulfonated polyether ether ketone) was dissolved in N-methyl-2-pyrrolidone (NMP), and thus a 10 wt % ion conductor solution was prepared. The ion conductor solution was coated on the glass substrate. The coated layer was dried for 24 hours at 50° C. Then, the coated layer was separated from the glass substrate, thereby a hydrocarbon-containing ion conductive layer having a thickness of 20 μm was formed.

The hydrocarbon-containing ion conductive layer was dipped into an IPA dispersion containing 10% of a Nafion, and then drying at 80° C. for 10 hours. Thus, a polymer electrolyte membrane comprising continuous coating layer of a fluorine-containing ion conductor was manufactured.

On the other hand, an electrode was prepared by coating an electrode slurry containing a Nafion binder on a PI film, and was cut out into the size of 5×5 cm². The electrode thus produced was transferred to the polymer electrolyte membrane while the pressure of 1,000 kg/cm² was applied at 100° C. so as to the membrane-electrode assembly was produced.

Comparative Example 3

A S-PEEK (sulfonated polyether ether ketone) was dissolved in N-methyl-2-pyrrolidone (NMP), and thus a 10 wt % ion conductor solution was prepared. The ion conductor solution was coated on the glass substrate. The coated layer was dried for 24 hours at 50° C. Then, the coated layer was separated from the glass substrate, thereby a hydrocarbon-containing ion conductive layer having a thickness of 20 μm was formed.

A solution for forming the fluorine-containing ion conductor was prepared by adding DMF of 5% into the IPA dispersion containing 10% of a Nafion. The hydrocarbon-containing ion conductive layer was dipped into the solution, and then drying at 80° C. for 10 hours. Thus, a polymer electrolyte membrane comprising continuous coating layer of a fluorine-containing ion conductor was manufactured.

On the other hand, an electrode was prepared by coating an electrode slurry containing a Nafion binder on a PI film, and was cut out into the size of 5×5 cm². The electrode thus produced was transferred to the polymer electrolyte membrane while the pressure of 1,000 kg/cm² was applied at 100° C. so as to the membrane-electrode assembly was produced.

Comparative Example 4

A polyamic acid/THF spinning solution at a concentration of 12 wt % was electrospun while a voltage of 30 kV was applied, and thereby a polyamic acid porous substrate precursor was formed. Subsequently, the porous substrate precursor was heat treated in an oven at 350° C. for 5 hours, and thus a polyimide porous substrate having an average thickness of 15 μm was produced. At this time, the electrospinning process was carried out using a spray jet nozzle at 25° C. while a voltage of 30 kV was applied.

A S-PEEK (sulfonated polyether ether ketone) as an ion conductor was dissolved in N-methyl-2-pyrrolidone (NMP), and thus a 10 wt % ion conductor solution was prepared.

The porous substrate was immersed in the ion conductor solution. Specifically, the dipping process was carried out three times for 20 minutes at normal temperature, and at this time, a reduced pressure atmosphere was applied for about one hour to eliminate fine gas bubbles. After that, the NMP was eliminated by drying in a hot air oven at 80° C. for 3 hours. The hydrocarbon-containing ion conducting layer having an average thickness of 45 μm was prepared by repeating the dipping and drying 3 times.

A solution for forming the fluorine-containing ion conductor was prepared by adding DMF of 5% into the IPA dispersion containing 10% of a Nafion. The hydrocarbon-containing ion conductive layer was dipped into the solution, and then drying at 80° C. for 10 hours. Thus, a polymer electrolyte membrane comprising continuous coating layer of a fluorine-containing ion conductor was manufactured.

On the other hand, an electrode was prepared by coating an electrode slurry containing a Nafion binder on a PI film, and was cut out into the size of 5×5 cm². The electrode thus produced was transferred to the polymer electrolyte membrane while the pressure of 1,000 kg/cm² was applied at 100° C. so as to the membrane-electrode assembly was produced.

Experiment Example 1

Analysis of Properties of Produced Membrane-Electrode Assembly

1) Measurement of transfer ratio: transfer ratio (%)=(an area of the electrode transferred to the polymer electrolyte membrane)/(a total area of the electrode on a releasing film)×100

2) Measurement of initial performance: an IV curve a variation of a current density based on a voltage was measured by a measuring device of a cell performance for a fuel cell.

3) Measurement of adhesion bonding strength: measuring an adhesion bonding strength by a tape After a tape for measuring a splitting resistance was attached to the electrode under a predetermined pressure, the tape was stripped off from the electrode. The adhesion bonding strength was measured according to the following criteria.

X: the electrode was adhered to the most area of the tape by examine with the naked eye.

Δ: the electrode was adhered to a partial area of the tape by examine with the naked eye.

◯: the electrode was hardly adhered to the tape by examine with the naked eye.

The results of the analysis are presented in the following Table 1.

TABLE 1

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| membrane structure | single layered membrane | single layered membrane | reinforced membrane | reinforced membrane | single layered membrane | single layered membrane | single layered membrane | reinforced membrane |
| The shape of the fluorine-containing ion conductor | discontinuous spot-shaped | discontinuous fiber-shaped | discontinuous spot-shaped | discontinuous fiber-shaped | none | continuous shaped | continuous shaped | continuous shaped |
| Transfer ratio (%) | 96 | 98 | 95 | 98 | 75 | 98 | not measurable | not measurable |
| Current density (@0.6 V, mA/cm$^2$) | 980 | 1010 | 970 | 985 | 780 | 870 | not measurable | not measurable |
| adhesion bonding strength | ○ | ○ | ○ | ○ | X | Δ | not measurable | not measurable |

According to the results of the above Table 1, it can be seen that the membrane-electrode assembly according to Examples had an excellent transfer ratio, an excellent initial performance and an excellent adhesion bonding strength compared to the membrane-electrode assembly according to Comparative Examples. Meanwhile, the transfer ratio, the initial performance and the adhesion bonding strength of Comparative Examples 3 and 4 are not measurable, since the hydrocarbon-containing ion conductive layer was damaged and crumpled by dipping into the solution having the organic solvent capable of dissolving the surface of the hydrocarbon-containing ion conductive layer.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a polymer electrolyte membrane, a method for manufacturing the same and a membrane-electrode assembly for a fuel cell. The polymer electrolyte membrane can improve the performance of a fuel cell by decreasing the interfacial resistance. The membrane-electrode assembly can be manufactured by a mass production since the polymer electrolyte membrane can easily bond to the electrode by transferring with improved efficiency.

The invention claimed is:

1. A polymer electrolyte membrane comprising:
a hydrocarbon-containing ion conductive layer; and
fiber-shaped or spot-shaped fluorine-containing ion conductors which are dispersed on the hydrocarbon-containing ion conductive layer in such a way that the hydrocarbon-containing ion conductive layer is revealed between the fiber-shaped or spot-shaped fluorine-containing ion conductors, the fiber-shaped fluorine-containing ion conductors having an average diameter ranging from 0.005 μm to 5 μm and a ratio of an average length to the average diameter of 100% or greater, the spot-shaped fluorine-containing ion conductors having an average diameter ranging from 0.005 μm to 10 μm, wherein the fiber-shaped or spot-shaped fluorine-containing ion conductors are included in the polymer electrolyte membrane in an amount of 0.1 to 10 wt % based on the total weight of the polymer electrolyte membrane.

2. The polymer electrolyte membrane of claim 1, wherein the fiber-shaped or spot-shaped fluorine-containing ion conductors are formed of a perfluorosulfonic acid (PFSA) resin.

3. The polymer electrolyte membrane of claim 1, wherein the hydrocarbon-containing ion conductive layer comprises any one selected form the group consisting of a sulfonated polyimide, a sulfonated polyarylethersulfone, a sulfonated polyether ether ketone, a sulfonated polybenzimidazole, a sulfonated polysulfone, a sulfonated polystyrene, a sulfonated polyphosphazene, and a combination thereof.

4. The polymer electrolyte membrane of claim 1, further comprising:
a porous substrate having a first surface and a second surface opposite to the first surface; and
a plurality of hydrocarbon-containing ion conductors filled in pores of the porous substrate;
wherein the hydrocarbon-containing ion conductive layer with the fiber-shaped or spot-shaped fluorine-containing ion conductors dispersed thereon is disposed on the first or second surface of the porous substrate.

5. The polymer electrolyte membrane of claim 4, wherein the porous substrate is formed of any one selected from the group consisting of a nylon, a polyimide, a polybenzoxazole, a polyethylene terephthalate, a polyethylene, a polypropylene, a polytetrafluoroethylene, a polyarylene ether sulfone, a polyether ether ketone, copolymers thereof, and a combination thereof.

6. A method for producing a polymer electrolyte membrane, the method comprising:
forming a hydrocarbon-containing ion conductive layer; and
dispersing fiber-shaped or spot-shaped fluorine-containing ion conductors on the hydrocarbon-containing ion conductive layer in such a way that the hydrocarbon-containing ion conductive layer is revealed between the fiber-shaped or spot-shaped fluorine-containing ion conductors, the fiber-shaped fluorine-containing ion conductors having an average diameter ranging from 0.005 to 5 μm and a ratio of an average length to the average diameter of 100% or greater, the spot-shaped fluorine-containing ion conductors having an average diameter ranging from 0.005 to 10 µm, wherein the fiber-shaped or spot-shaped fluorine-containing ion conductors are included in the polymer electrolyte membrane in an amount of 0.1 to 10 wt % based on the total weight of the polymer electrolyte membrane.

7. The method of claim 6, further comprising:
preparing a porous substrate having a first surface and a second surface opposite to the first surface; and
filling a plurality of hydrocarbon-containing ion conductors in the pores of the porous substrate,
wherein the hydrocarbon-containing ion conductive layer is formed on the first or second surface of the porous substrate.

8. The method of claim 6, wherein the fiber-shaped or spot-shaped fluorine-containing ion conductors are dispersed on the hydrocarbon-containing ion conductive layer by electrospinning or spraying a solution for forming the fiber-shaped or spot-shaped fluorine-containing ion conductors.

9. The method of claim 8, wherein the solution comprises an organic solvent capable of dissolving a surface of the hydrocarbon-containing ion conductive layer.

10. The method of claim 9, wherein the solution further comprises an alcohol dispersion of the fiber-shaped or spot-shaped fluorine-containing ion conductors.

11. The method of claim 9, wherein the organic solvent is any one selected from the group consisting of N-methyl-2-pyrrolidine, dimethylformamide, dimethylacetamide, dimethylsulfoxide, and a combination thereof.

12. The method of claim 6, wherein the dispersing the fiber-shaped or spot-shaped fluorine-containing ion conductors includes:
preparing a solution comprising an alcohol dispersion of the fiber-shaped or spot-shaped fluorine-containing ion conductors and an organic solvent capable of dissolving the hydrocarbon-containing ion conductive layer; and
coating the solution on the hydrocarbon-containing ion conductive layer.

13. A membrane-electrode assembly comprising:
an anode and a cathode facing each other; and
a polymer electrolyte membrane disposed between the anode and the cathode,
wherein the polymer electrolyte membrane comprises
a hydrocarbon-containing ion conductive layer, and
fiber-shaped or spot-shaped fluorine-containing ion conductors which are dispersed on the hydrocarbon-containing ion conductive layer in such a way that the hydrocarbon-containing ion conductive layer is revealed between the fiber-shaped or spot-shaped fluorine-containing ion conductors, the fiber-shaped fluorine-containing ion conductors having an average diameter ranging from 0.005 µm to 5 µm and a ratio of an average length to the average diameter of 100% or greater, the spot-shaped fluorine-containing ion conductors having an average diameter ranging from 0.005 µm to 10 µm,
wherein the fiber-shaped or spot-shaped fluorine-containing ion conductors are included in the polymer electrolyte membrane in an amount of 0.1 to 10 wt % based on the total weight of the polymer electrolyte membrane.

14. The membrane-electrode assembly of claim 13, wherein the anode or the cathode includes a fluorine-containing binder.

15. The polymer electrolyte membrane of claim 1, wherein the fiber-shaped or spot-shaped fluorine-containing ion conductors are bonded to the hydrocarbon-containing ion conductive layer after dissolving a surface of the hydrocarbon-containing ion conductive layer by an organic solvent capable of dissolving the hydrocarbon-containing ion conductive layer.

* * * * *